UNITED STATES PATENT OFFICE.

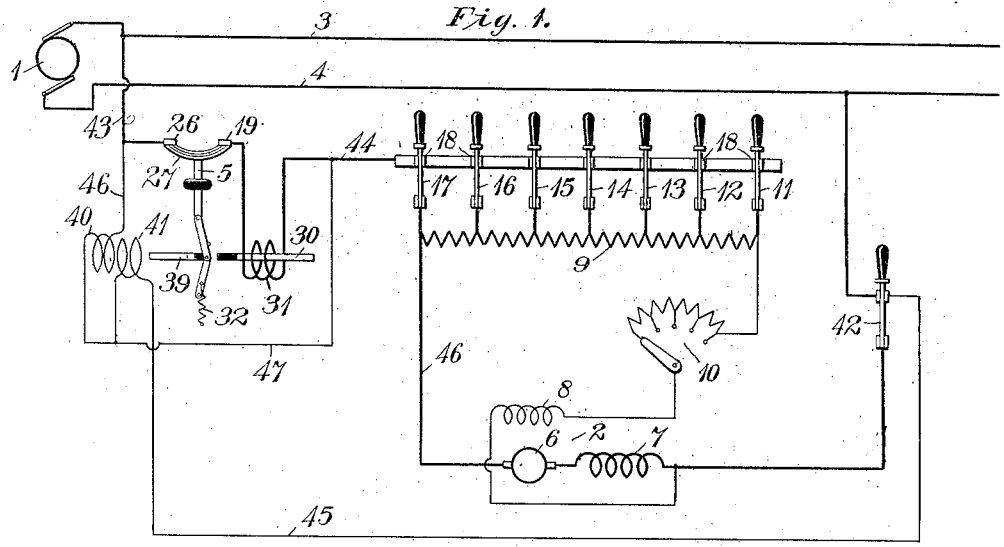
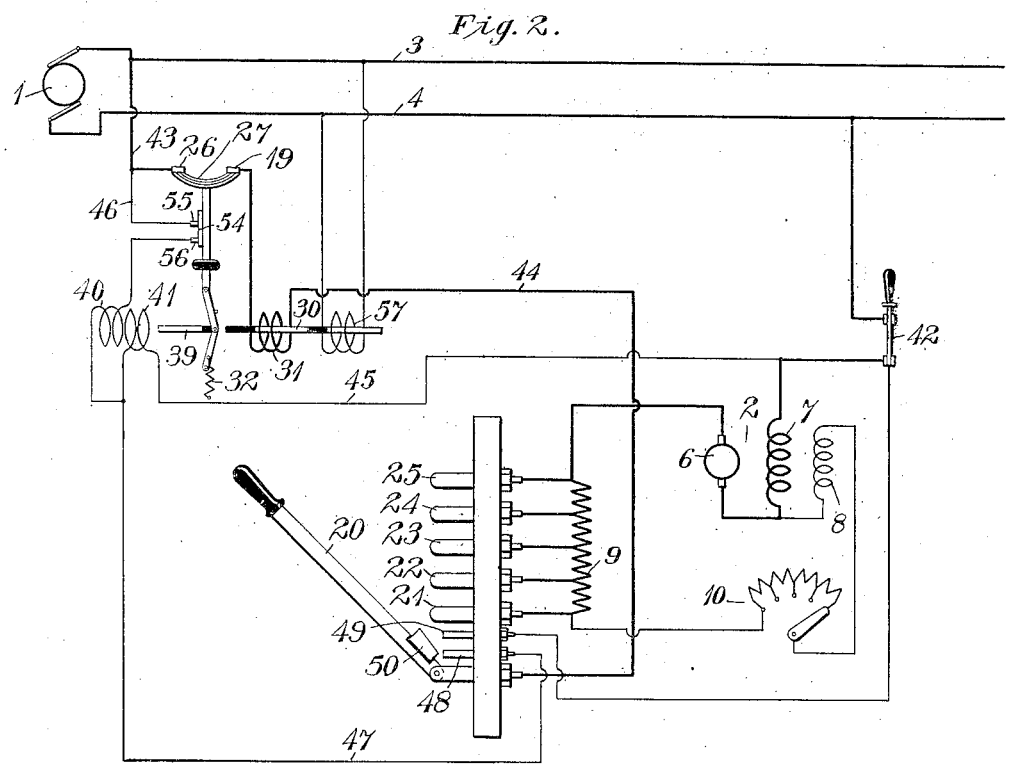

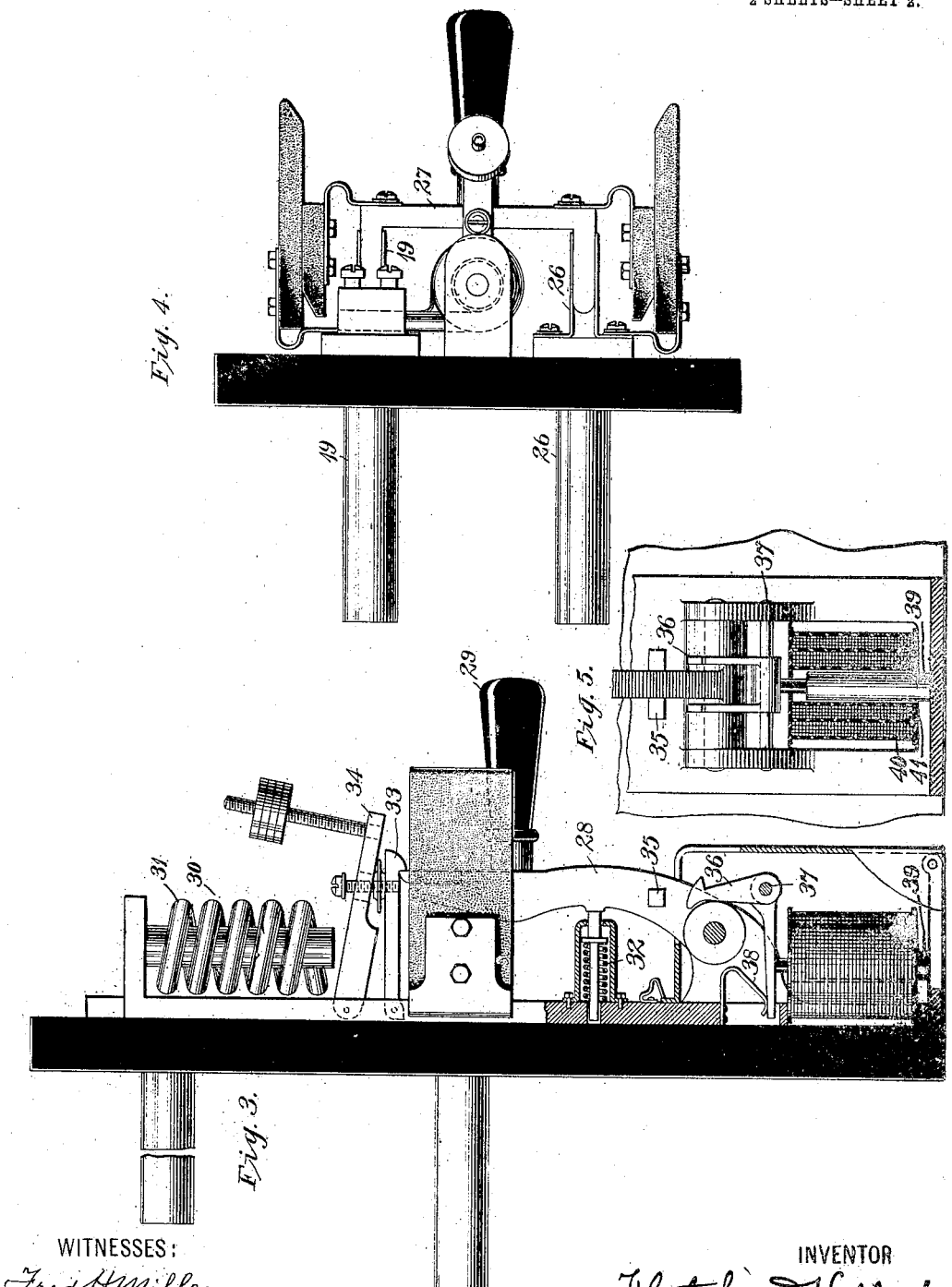

FLETCHER D. HALLOCK, OF WILKINSBURG, PENNSYLVANIA, ASSIGNOR TO WESTINGHOUSE ELECTRIC & MANUFACTURING COMPANY, A CORPORATION OF PENNSYLVANIA.

SYSTEM OF ELECTRIC-MOTOR CONTROL.

No. 892,419.    Specification of Letters Patent.    Patented July 7, 1908.

Application filed December 3, 1906. Serial No. 346,078.

*To all whom it may concern:*

Be it known that I, FLETCHER D. HALLOCK, a citizen of the United States, and a resident of Wilkinsburg, in the county of Allegheny and State of Pennsylvania, have invented a new and useful Improvement in Systems of Electric-Motor Control, of which the following is a specification.

My invention relates to controlling means for electric motors, and has special reference to systems or devices which are adapted for starting relatively large motors.

The object of my invention is to provide means that shall be simple and durable in construction and effective in operation for starting relatively large electric motors and at the same time eliminating the possibility of injuring their windings by increasing the applied voltage too rapidly.

For starting relatively large electric motors, a plurality of independently-operated switches and a coöperating resistance are sometimes utilized in lieu of the ordinary forms of starting rheostats usually employed with motors of the smaller sizes. The several switches comprised in a starter of the aforesaid class have sometimes been mechanically or electrically interlocked in order to prevent the closure of the switches in other than a predetermined order, or to automatically interrupt the motor circuit in case the switches were so closed. These devices have usually been complicated and expensive, since they have been applied to each switch of the series, and in many instances the motor circuit might be unnecessarily interrupted. For example, one switch of the series might remain open, if the load on the motor during the period of starting were light, without severely overloading the line or injuring the motor.

According to my present invention, by a relatively simple modification of the automatic circuit-breaker which is ordinarily located in the motor circuit, irrespective of the form of starting device, I prevent the completion of the motor circuit unless and until all the switches of the series comprised in the motor starter are open.

A further advantage of my improved system lies in the fact that it may be applied equally well to any well known form of rheostatic controller. If the switches are closed so that the resistance is reduced too rapidly, the main circuit-breaker will be opened and the accelerating process must be re-commenced, as above indicated.

My invention is illustrated in the accompanying drawings, in which.

Figures 1 and 2 are diagrammatic views of motor starting devices arranged in accordance therewith. Figs. 3 and 4 are, respectively, a side elevation and a plan view of a main circuit interrupter of well known type which is suitably modified for use in connection with the systems illustrated in Figs. 1 and 2, and Fig. 5 is a front elevation of the retaining latch and differential coils of the circuit interrupter.

Referring to Figs. 1, 3, 4 and 5 of the drawings, electric energy is supplied from any convenient source, such as generator 1, to an electric motor 2 through main line conductors 3 and 4 and a main circuit interrupter 5. The motor 2 comprises an armature 6, a series field magnet winding 7 and a shunt field magnet winding 8, and may be accelerated in a well known manner by introducing a starting resistance 9 into the motor circuit and gradually diminishing the active amount of this resistance. The amount of current traversing the shunt field magnet winding 8 may be varied by a field rheostat 10. The accelerating resistance of the motor is controlled by a series of similar manually operated switches 11, 12, 13, 14, 15, 16 and 17, which are connected to the ends and to a plurality of intermediate points in the resistance 9. As each of these switches is closed, contact is made from the point of connection with the resistance to one of a series of coöperating contact members 18, all of which are connected to a terminal 19 of the main circuit interrupter 5. The main circuit interrupter comprises stationary contact terminals 19 and 26, a movable bridging contact member 27, a pivotally mounted lever 28, an operating handle 29, a release magnet 30 having a winding 31, an opening spring 32, a latch 33 for holding the interrupter in its closed position, and a pivotally mounted tripping armature 34. The lever 28 is provided with lateral projections 35 which may engage a two-part latch 36, under predetermined conditions hereinafter explained. The two-part latch 36 is in the form of a bell-crank lever and is pivotally mounted upon a shaft 37. A spring 38 normally holds the latch 36 in such a position that it does not interfere with the free action of the interrupter, but a magnetizable core 39 is adapted to oppose the spring 38 when energized by either one of a pair of differential coils 40 and 41, and thereby prevent the closure of the breaker. The differential coils 40 and 41 are so connected as to neutralize each other when the switches 11, 12, 13, 14, 15, 16 and 17 are disengaged from the contact members 18. Consequently, for starting the motor, a main line switch 42 and the circuit interrupter 5 may be first closed in any order, the accelerating switches being subsequently closed and the resistance 9 gradually short-circuited unless the electric current traversing the release coil 31 exceeds a predetermined amount. If, however, the accelerating switches are closed too rapidly or in such an irregular order as to trip the main line circuit interrupter 5, this interrupter will be forced to its open position by the spring 32 and will be held in such position by the latch 36 until all of the accelerating switches are again open.

Referring particularly to Fig. 1, the circuit connections for the system may be traced as follows:—Assuming that main circuit interrupter 5 and line switch 42 are closed, electrical energy is supplied from the generator 1 through line conductor 3, conductor 43, stationary contact members 26 and 19, movable contact member 27, overload release coil 31, and a conductor 44 to the stationary contact members 18. When the circuit-breaker 5 and the main line switch 42 are both open, energy is supplied from line conductor 3, through conductor 46, differential coils 40 and 41, in opposite directions, and auxiliary conductor 45 to the opposite line conductor 4. The resultant magnetic effect of the coils 40 and 41 will be zero and the circuit-breaker may therefore be closed. The differential coil 40, however, is short-circuited as soon as the circuit-breaker 5 is closed and a circuit is completed from the conductor 44 through the differential coil 41 and the auxiliary conductor 45 which is connected to the line conductor 4. The energizing of the coil 41 has no effect upon the circuit-breaker, under the conditions just stated, because the breaker is closed. The motor 6 may now be included in the circuit in series with the resistance 9 by closing the switch 11, whereupon circuit will be continued from the stationary contact members 18, through switch 11, resistance 9, conductor 46, armature 6, series field magnet winding 7, and the switch 42 to the line conductor 4. The resistance 9 may be gradually short-circuited to accelerate the motor by successively closing the switches 12, 13, 14, 15, 16 and 17.

In case an inexperienced attendant should attempt to accelerate the motor by closing the switches in other than the order indicated above, a large momentary increase in the line current would result which would sufficiently energize the coil 31 to trip the circuit-breaker 5. In this event, one or more of the accelerating switches being closed and the circuit interrupter 5 being opened, circuit would be established from line conductor 3 through differential coil 40 and conductor 47 to the stationary contact members 18 and, from this point, through the closed accelerating switch, a corresponding portion of the resistance 9, motor 2, and switch 42 to the opposite line conductor 4. It will be observed that the differential coil 41 would be thus short-circuited and the coil 40 would serve to hold the circuit-breaker 5 in its open position until all the accelerating switches were opened. The tripping coil 31 may also be energized if the accelerating switches are closed in the proper order but in too rapid succession.

Referring now to Fig. 2, in which a modified motor-starting arrangement is illustrated, a single knife blade switch 20, which is adapted to successively engage a plurality of coöperating stationary contact members 21, 22, 23, 24 and 25 as it is closed, corresponds to the accelerating switches 11, 12, 13, 14, 15, 16 and 17 of Fig. 1, the stationary contact terminals being connected to corresponding points in the resistance 9. A pair of auxiliary contact members 48 and 49 are so arranged as to be bridged by a movable contact member 50 before the switch blade makes contact with any of the main stationary contact members, so that the switch must be opened wide, as hereinafter explained, before it is possible to reclose the circuit-breaker after it has been tripped for any reason. The interrupted auxiliary circuit 47 is connected to contacts 48 and 49 and the auxiliary circuit 46 is also capable of being interrupted, a bridging contact member 54, which engages stationary contact members 55 and 56, being so arranged as to interrupt the circuit when the circuit-breaker 5 occupies its extreme open position. The advantage of the arrangement illustrated in Fig. 2 lies in the fact that differential coils 40 and 41, as well as all of the other parts of the motor-control system, are disconnected from the supply circuit when the circuit-breaker and the switch 42 are open. The acceleration of the motor may be effected as follows:—The switch 42 and the circuit-breaker 5 may be closed in any order, provided the accelerating switch 20 is open so that the auxiliary circuit 47 is interrupted by the stationary contact members 48 and 49, since either or both of the differential coils 40 and 41 are energized. After the circuit-breaker and switch are closed, the motor may be accelerated by slowly closing the switch 20 which completes a main circuit from line conductor 3, through conductor 43, circuit-breaker 5, release coil 31, conductor 44, switch blade 20, stationary contact member 21, resistance 9, armature 6, series field magnet winding 11 of the motor 2 and switch 42 to the opposite line conductor 4. When the switch 20 is fully closed the resistance 9 is short-circuited and the circuit is completed through the stationary contact member 25. If the switch 20 is closed so rapidly that the motor has not sufficient time to accelerate, the tripping coil 31 will cause the main circuit-breaker 5 to open and it will then be impossible to again completely close the circuit-breaker until the switch 20 has been sufficiently opened to interrupt the auxiliary circuit 47. The action of the differential coils 40 and 41 is substantially the same in the systems illustrated in both diagrams.

The contact members 55 and 56 are bridged by the contact member 54 when the breaker 5 is first moved away from its full open position so that if either of the differential coils becomes energized, the catch will be interposed and will prevent the complete closure of the motor circuit. A second release coil 57 is shown in Fig. 2 which is dependent for its operation upon an abnormal rise in the voltage of the circuit 3—4, and it will be readily understood that the opening of the circuit may be effected under other conditions, according to well known circuit-breaker practice. For example, such an interruption may be made to depend upon a temporary decrease in voltage.

I desire that variations which do not depart from the spirit of my invention shall be included within its scope, and that only such limitations be imposed as are indicated in the appended claims.

I claim as my invention:—

1. The combination with an electric circuit, a resistance and a circuit interrupter tending to open when closed, of means for holding the interrupter closed, and other means dependent upon the short-circuiting of any portion of the resistance for preventing the closure of the interrupter when open.

2. The combination with an electric supply circuit, a motor, a starting resistance, a plurality of short-circuiting switches therefor, and an automatic interrupter in the motor circuit tending to open when closed, of means independent of the short-circuiting switches for preventing the closure of the interrupter when any portion of the resistance is short-circuited.

3. The combination with an electric supply circuit, a motor and a starting resistance, and a plurality of short-circuiting switches therefor, and an interrupter in the motor circuit tending to open when closed, and means for holding the interrupter closed, of electrically controlled means for preventing the closure of the interrupter when any portion of the starting resistance is short-circuited.

4. The combination with an electric supply circuit, a motor, a starting resistance, and a plurality of short-circuiting switches therefor, an automatic interrupter in the motor circuit tending to open when closed, means for holding the interrupter closed and an overload release magnet therefor, of electrically controlled means independent of the short-circuiting switches for preventing the closure of the interrupter when any portion of the starting resistance is short-circuited.

5. The combination with an electric supply circuit, an automatic circuit interrupter, an electric motor, a starting resistance therefor and manually-operated means for gradually short-circuiting the resistance, of means comprising a pair of normally balanced differential magnet coils for preventing the closure of the interrupter when any portion of the resistance is short-circuited.

6. The combination with an electric supply circuit, an automatic circuit interrupter, an electric motor, a starting resistance therefor, and manually-operated means for gradually short-circuiting the resistance, of means comprising an electro-magnetically-controlled locking device and a pair of differential magnet coils therefor for preventing the closure of the interrupter when any portion of the resistance is short-circuited.

7. The combination with a supply circuit, a motor-starting resistance, a series of manually-operated control switches therefor, and an automatic circuit interrupter, of an electro-magnetically-controlled latch for preventing the closure of the circuit interrupter, and differential coils for the latch which are unbalanced when the circuit interrupter is open and any one of the control switches is closed.

In testimony whereof, I have hereunto subscribed my name this 28th day of November, 1906.

FLETCHER D. HALLOCK.

Witnesses:
DUDLEY A. BOWERS,
BIRNEY HINES.